(12) United States Patent
DuPuis et al.

(10) Patent No.: US 7,501,968 B2
(45) Date of Patent: Mar. 10, 2009

(54) INTEGRATED MULTI-MODE SENSOR

(75) Inventors: Paul B. DuPuis, Glendale, AZ (US);
William E. Ott, Phoenix, AZ (US)

(73) Assignee: Honeywell International, Inc.,
Morristown, NJ (US)

( * ) Notice: Subject to any disclaimer, the term of this patent is extended or adjusted under 35 U.S.C. 154(b) by 108 days.

(21) Appl. No.: 11/639,686

(22) Filed: Dec. 15, 2006

(65) Prior Publication Data
US 2008/0143569 A1 Jun. 19, 2008

(51) Int. Cl.
*H03M 1/00* (2006.01)
(52) U.S. Cl. ............................ 341/141; 341/143
(58) Field of Classification Search ............... 341/141, 341/144, 155, 120, 118, 119
See application file for complete search history.

(56) References Cited

U.S. PATENT DOCUMENTS 5,245,343 A 9/1993 Greenwood et al.
5,402,171 A * 3/1995 Tagami et al. ............ 348/219.1
6,323,912 B1 * 11/2001 McIntyre ................. 348/552
6,674,387 B1 1/2004 Ott
7,301,562 B2 * 11/2007 Belz et al. ............ 348/207.99

* cited by examiner

*Primary Examiner*—Brian Young
(74) *Attorney, Agent, or Firm*—Blacke Lowe & Graham PLLC

(57) ABSTRACT

An integrated multi-mode sensor system is described that integrates into a single housing a sensor, signal conditioning circuitry, calibration memory, and interface circuitry that is compatible with both analog and digital end-use circuits. The sensor includes a housing, a sensor circuit, memory, and an interface circuit. The sensor circuit is disposed within the sensor housing, is operable, upon being energized, to supply an output signal that varies with at least one physical parameter to which the sensor circuit is exposed. The interface circuitry disposed within the sensor housing is adapted to receive a mode select signal and the sensor signal. The output circuit is selectively configurable, in response to the mode select signal, to implement one of a plurality of signal processing modes, including analog voltage output, asynchronous pulse density modulation (APDM) and synchronous pulse density modulation (SPDM) of various moduli, and an APDM or SPDM mode using a selectable I$^2$C or SPI interface protocol.

20 Claims, 5 Drawing Sheets

| MODE CONTROL | | | SIGNAL PROCESSING MODE |
|---|---|---|---|
| C | B | A | |
| 0 | 0 | 0 | ANALOG |
| 0 | 0 | 1 | ASYNCHRONOUS PDM |
| 0 | 1 | 0 | SYNCHRONOUS PDM (clk/4) |
| 0 | 1 | 1 | SYNCHRONOUS PDM (clk/8) |
| 1 | 0 | 0 | SYNCHRONOUS PDM (clk/16) |
| 1 | 0 | 1 | SYNCHRONOUS PDM (clk/32) |
| 1 | 1 | 0 | SYNCHRONOUS PDM (clk/64) |
| 1 | 1 | 1 | SYNCHRONOUS PDM (clk/128) |

FIG. 5

INTEGRATED MULTI-MODE SENSOR

TECHNICAL FIELD

The present invention generally relates to sensors and, more particularly, to a sensor that is selectively configurable to implement one of a plurality of signal processing modes.

BACKGROUND

Many aircraft, including general aviation aircraft, unmanned air vehicles (UAVs), missiles, and experimental and research aircraft, use various pressure and other sensors and associated signal processing circuits to determine various flight-related "air data" and other parameters. For example, many aircraft include a plurality of pressure sensors to sense at least static pressure and total pressure during aircraft flight. The subsequent signal processing circuits, using pressure signals derived from the pressure sensors, calculate air data parameters representative of various flight-related conditions. Such data may include, for example, Mach (M), calibrated airspeed (CAS), aircraft altitude, angle of attack (AOA), and angle of slip (AOS), just to name a few. Recently, sensors and selected processing circuits have been packaged together into what may be referred to as an integrated sensor system (ISS). In contrast to prior discrete component implementations, an ISS has the sensor and associated signal processing circuitry co-located within the sensor package.

An ISS typically includes a sensor die, which may include just a pressure sensor or both a pressure sensor and a temperature sensor. The temperature sensor, if included, is typically provided to aid in temperature compensation of the pressure measurement. The ISS also typically includes signal conditioning, data conversion, control, and memory circuits for use in conjunction with an external microcomputer. The signal conditioning and data conversion circuits, which are in many instances implemented as amplifier-based circuits, supply appropriate sensor signals representative of the sensed pressure and or temperature for use by external circuitry.

It may be appreciated that the configuration of the output signals provided by an ISS may vary depending, for example, on the type of signal processing that is implemented by the external end-use circuits. For example, if the end-use circuit is an analog system, then the ISS will need to provide an analog signal. Similarly, if the end-use system is a digital circuit, then the ISS will need its output to be configured as a digital signal. Although presently known ISSs are generally safe, reliable, and robust, these systems can exhibit certain drawbacks.

For example, many ISSs do not provide adequate interface flexibility and measurement capability, and/or adequate measurement resolution for air data and other low-noise precision applications. Many ISSs also exhibit relatively excessive latency for wide bandwidth control systems, and/or insufficient measurement accuracy and stability over time, temperature, and humidity, and/or insufficient reliability due to non-hermetic packaging, and/or limited interface configurability to meet system needs. Moreover, many so-called "smart sensors" (those with an internal microcomputer) have inadequate capability to perform high accuracy pressure measurements (>20 bit resolution) at the high measurement rates (>200 Hz) that may be needed for air data and other applications requiring low latency (<5 ms).

Hence, there is a need for a precision, environmentally-compatible, integrated sensor system that incorporates a sensor, signal conditioning circuitry, and appropriate interface circuitry within a single housing, and is compatible with a multiplicity of both analog and digital end-use circuits. Furthermore, other desirable features and characteristics of the present invention will become apparent from the subsequent detailed description of the invention and the appended claims, taken in conjunction with the accompanying drawings and this background of the invention.

BRIEF SUMMARY

In one embodiment, and by way of example only, a sensor includes a sensor housing, a sensor circuit, and an output circuit. The sensor circuit is disposed within the sensor housing, is adapted to be energized, and is operable, upon being energized, to supply an analog sensor signal that varies with at least one physical parameter to which the sensor circuit is exposed. The output circuit is disposed within the sensor housing, and is adapted to receive a mode select signal and the sensor signal. The output circuit is selectively configurable, in response to the mode select signal, to implement one of a plurality of signal processing modes, and is operable, upon receipt of the analog sensor signal, to supply an output signal representative of the at least one physical parameter in accordance with the implemented signal processing mode.

In yet another exemplary embodiment, a pressure sensor includes a sensor housing, a pressure sensitive diaphragm, a plurality of resistors, an amplifier circuit, and an output circuit. The pressure sensitive diaphragm is disposed within the sensor housing, is adapted to be exposed to a pressure, and is configured, upon being exposed thereto, to move. The plurality of resistors is disposed on the pressure sensitive diaphragm, and each has a resistance that varies at least with movement of the pressure sensitive diaphragm. The plurality of resistors is adapted to be energized and supply a voltage signal based at least in part on the resistances thereof. The amplifier circuit is disposed within the sensor housing, is coupled to receive the voltage signal, and is operable, upon receipt thereof, to supply a sensor signal. The output circuit is disposed within the sensor housing, is adapted to receive a mode select signal and the sensor signal, and is selectively configurable, in response to the mode select signal, to implement one of a plurality of signal processing modes, and operable, upon receipt of the analog sensor signal, to supply an output signal representative of the at least one physical parameter in accordance with the implemented signal processing mode.

BRIEF DESCRIPTION OF THE DRAWINGS

The present invention will hereinafter be described in conjunction with the following drawing figures, wherein like numerals denote like elements.

FIG. 5 is a table that depicts the type of signal processing mode that is implemented by the circuit depicted in FIG. 4 based on the logic states of portions of the circuit.

DETAILED DESCRIPTION OF A PREFERRED EMBODIMENT

The following detailed description of the invention is merely exemplary in nature and is not intended to limit the invention or the application and uses of the invention. Furthermore, there is no intention to be bound by any theory presented in the preceding background of the invention or the following detailed description of the invention.

Figure 1:
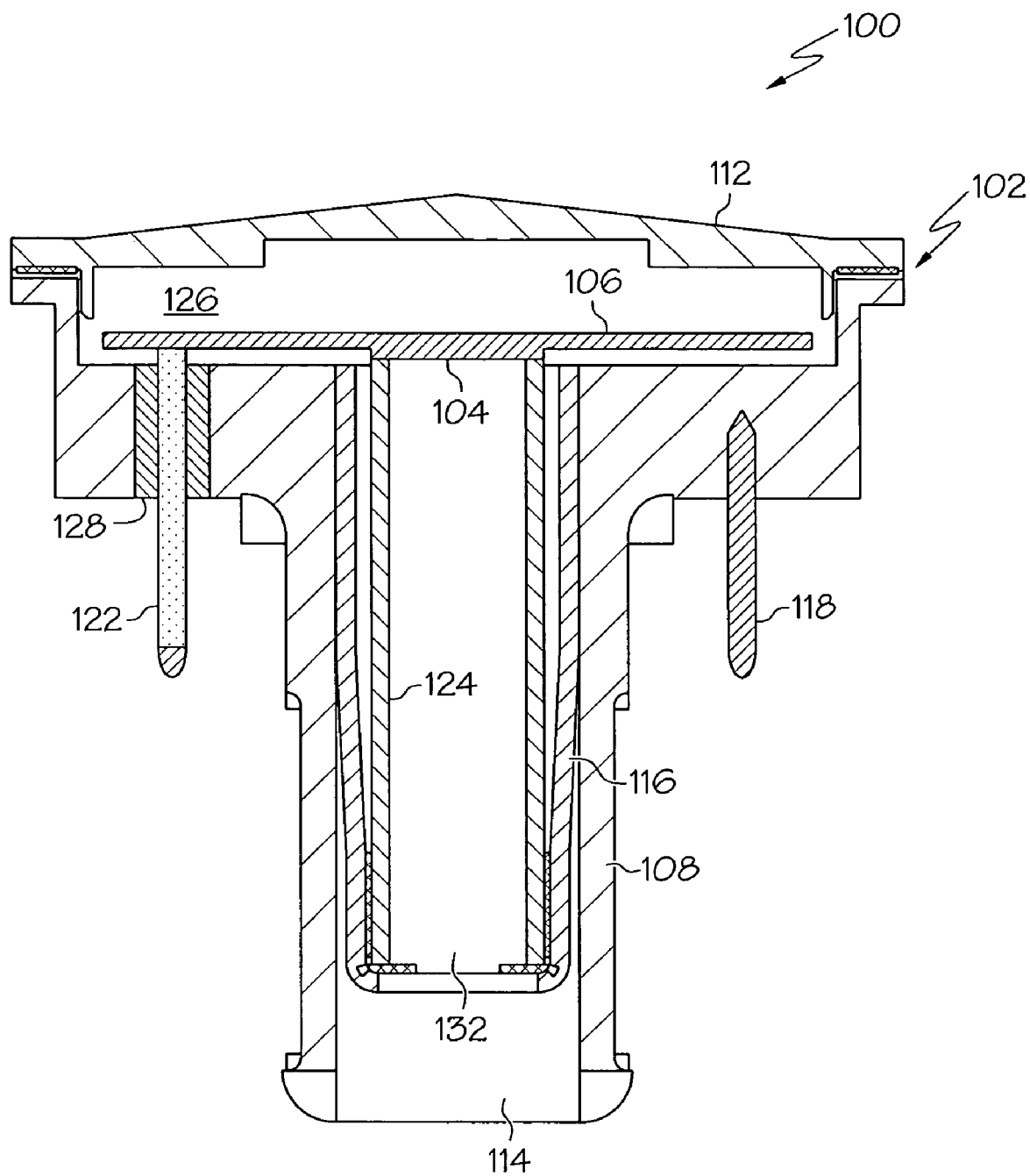
FIG. 1 is a cross section view of a sensor according to an exemplary embodiment of the present invention.

Turning now to FIG. 1, a cross-section view of an exemplary physical implementation of a multi-mode sensor 100 is depicted. The sensor 100 includes a sensor housing 102, a sensor die 104, and a hybrid substrate 106 having non-illustrated electronic circuitry disposed thereon. Before proceeding further, it is noted that the sensor 100 depicted in FIG. 1 is implemented as an absolute pressure sensor having an integral temperature sensor. It will be appreciated, however, that the sensor 100 could be implemented as any one of numerous types of pressure sensors, or as any one of numerous other types of sensors useful to sense one or more physical parameters. For example, rather that an absolute pressure sensor, the sensor 100 could be implemented as a gage pressure sensor or a differential pressure sensor. Alternatively, the sensor 100 could be implemented as a temperature sensor, a fluid level sensor, a moisture sensor, or a flow sensor, just to name a few, with the specific package configuration varying dependent on the sensed parameter(s).

Returning now to a description of the depicted sensor 100, the sensor housing 102 includes a header 108 and a cover 112, which are coupled to one another via, for example, a welding process. The header 108, which is preferably formed of stainless steel, has a pressure inlet port 114 formed therein, through which the medium whose pressure is being sensed may enter. The sensor housing 102 additionally includes a stress isolation sleeve 116, a housing ground pin 118, and one or more interconnection pins 122. The stress isolation sleeve is coupled to the sensor housing 102 via, for example, a brazing process, and is further coupled to a sensor die mount tube 124, which is preferably formed of a glass, such as borosilicate glass, and on which the sensor die 104 is mounted. The stress isolation sleeve 116 is configured to at least assist in isolating the sensor die 104 from packaging stress. It is additionally noted that the braze between the stress isolation sleeve 116 and the header 108 isolates the pressure inlet port 114 from a vacuum reference chamber 126 that is defined between the header 108 and cover 112.

The housing ground pin 118 is provided to electrically couple the header 108 to a reference potential (e.g., circuit ground). The interconnection pins 122 extend through the header 108 and are used to electrically couple the sensor die 104 and the electronic circuitry on the hybrid substrate 106 to external equipment. As FIG. 1 depicts, the interconnection pins 122 preferably extend through the header 108 via insulating seals 128 that are preferably made of, for example, glass.

Figure 2:
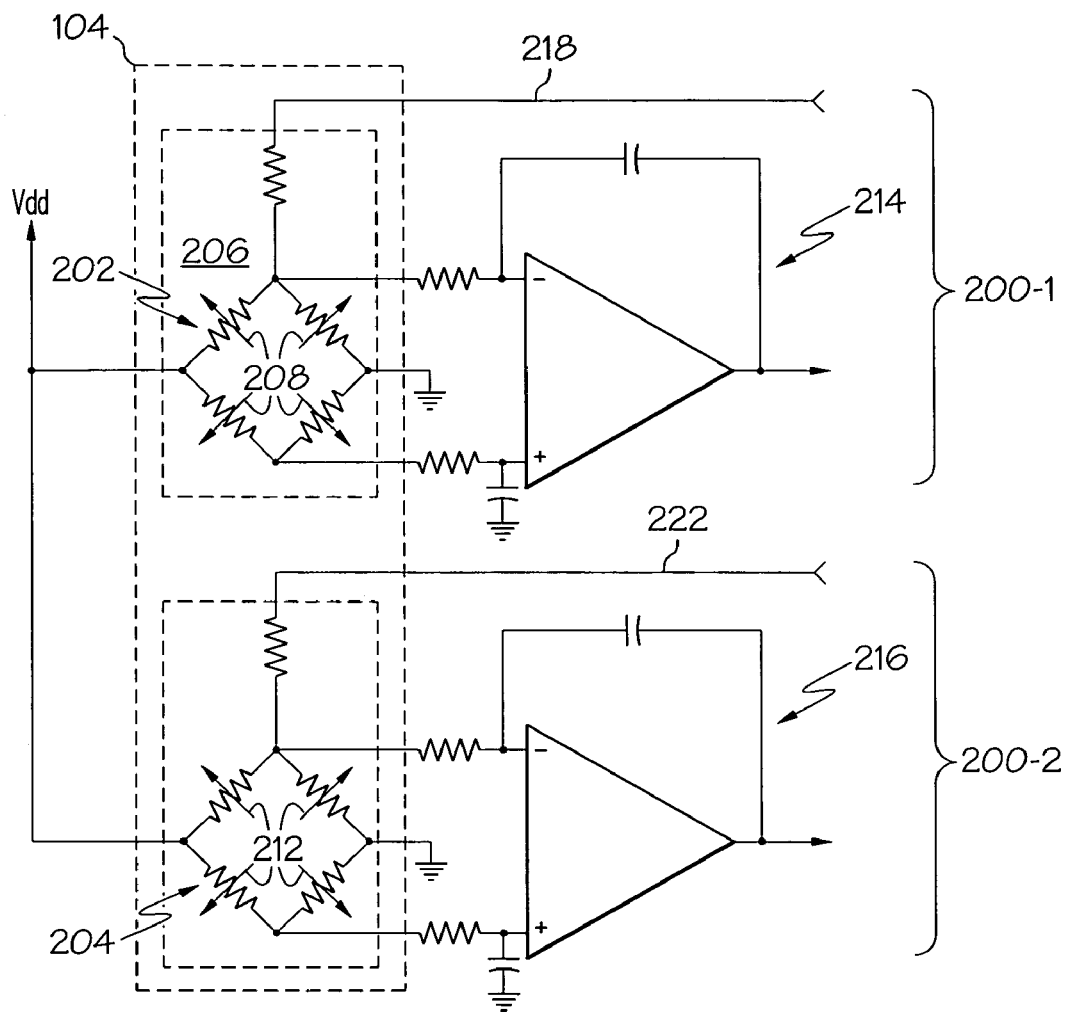
FIG. 2 is a schematic diagram of sensor circuitry that may be used to implement the exemplary sensor depicted in FIG. 1.

The sensor die 104, as was noted above, is mounted on the sensor die mount tube 124, and is exposed to the vacuum reference chamber 126, and to the medium whose pressure is being sensed via openings 132 formed through the stress isolation sleeve 116 and sensor die mount tube 124. With reference now to FIG. 2, it is seen that the sensor die 104 preferably includes a pressure sensor 202 and a temperature sensor 204. The pressure sensor 202 and temperature sensor 204 sense the pressure and temperature, respectively, of the medium to which the sensor die 104 is exposed, and supplies sensor signals representative of these parameters to electronic circuitry on the hybrid substrate 106. Although the pressure sensor 202 may be implemented in accordance with any one of numerous configurations now known or developed in the future, in the depicted embodiment it is implemented as a solid state, piezoresistive-type pressure sensor, which includes a pressure sensitive diaphragm 206 and a plurality of resistors 208. The pressure sensitive diaphragm 206 is formed in the sensor die 104 and moves, or flexes, in response to variations in the pressure of the medium. The resistors 208, which are preferably implemented as piezoresistors, are disposed on the diaphragm 206, and are coupled together in a Wheatstone bridge circuit configuration. As is generally known, the resistance of a piezoresistor varies with variations in the stress that is applied thereto. Thus, movement of the diaphragm 206 causes variations is stress of the resistors 208, and thus the resistances thereof. These variations in resistances are representative of variations in pressure.

The temperature sensor 204 may also be implemented in accordance with any one of numerous configurations now known or developed in the future. However, in the depicted embodiment the temperature sensor 204 is implemented using a plurality of on-die silicon resistance temperature devices (RTDs) 212 coupled together in a Wheatstone bride circuit configuration. As is generally known, the resistance of an RTD varies with variations in temperature to which it is exposed.

As FIG. 2 additionally depicts, the sensor circuitry disposed on the sensor die 104 (e.g., the resistors 208 and the RTDs 212), is preferably coupled to other electronic circuitry. Although this additional circuitry may vary, or may not be included at all, in the depicted embodiment, this additional circuitry includes a pair of integrator circuits 214, 216, and a pair of feedback circuits 218, 222. In addition, the resistors 208 and RTDs 212 are coupled to be energized from an external power source ($V_{dd}$). Although these electronic circuits 214-222 are depicted as being disposed remote from the sensor die 104, such as on the hybrid substrate 106, one or more of these circuits 214-222 could be disposed, in whole or in part, on the sensor die 104. In either case, the sensor circuits in the depicted embodiment include a first sensor circuit 200-1, which includes the resistors 208 and its associated integrator circuit 214 and feedback circuit 218, and second sensor circuit 200-2, which includes the RTDs 212 and its associated integrator circuit 216 and feedback circuit 222. It is noted that the sensor circuits 200-1, 200-2 are each configured using conventional circuitry, and operate in a conventional manner to supply an analog sensor signal representative of the associated physical parameter (e.g., pressure and temperature). Because the sensor circuits 200-1, 200-2, as was just noted, are preferably implemented using conventional circuitry that operate in a conventional manner, a more detailed description of the operations of each need not, and will not, be further described.

Figure 3:
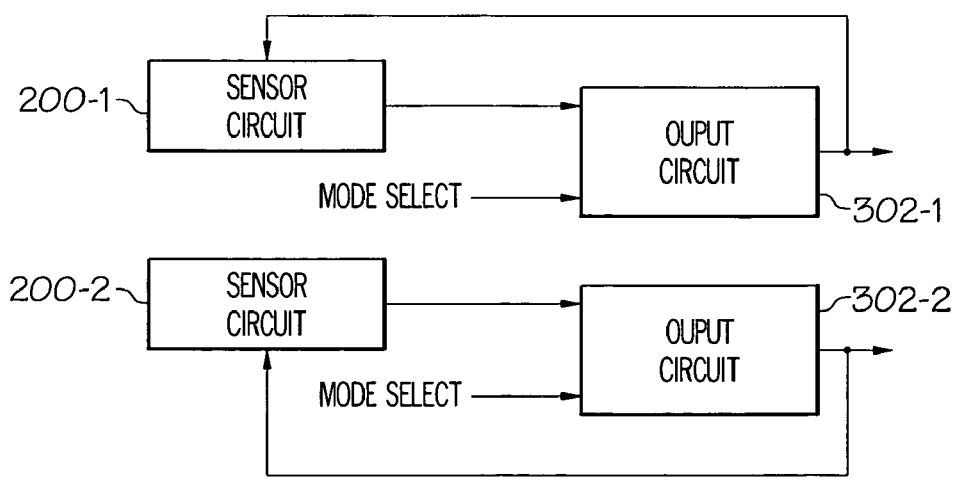
FIG. 3 is a functional block diagram of at least a portion of the sensor depicted in FIG. 1.

Returning once again to FIG. 1, it is seen that the sensor die 104 is coupled to the hybrid substrate 106, which is in turn coupled to one or more of the interconnection pins 122. The hybrid substrate 106, as was noted above, has electronic circuitry disposed thereon. This electronic circuitry includes at least an output circuit (not illustrated in FIGS. 1 and 2) associated with each sensor circuit 200-1, 200-2 and, as was noted above, may additionally include portions of the sensor circuits 200-1, 200-2. The electronic circuitry functions, among other things, to supply electrical excitation to the sensor die 104 and to supply, via the interconnection pins 122 and in accordance with one of a plurality of signal processing modes, output signals representative of the physical parameters sensed by the sensor die 104. With reference now to FIG. 3, which depicts the sensor 100 and in a functional block diagram form, a more detailed description of the processing modes that the electronic circuitry may implement will now be described.

Figure 4:
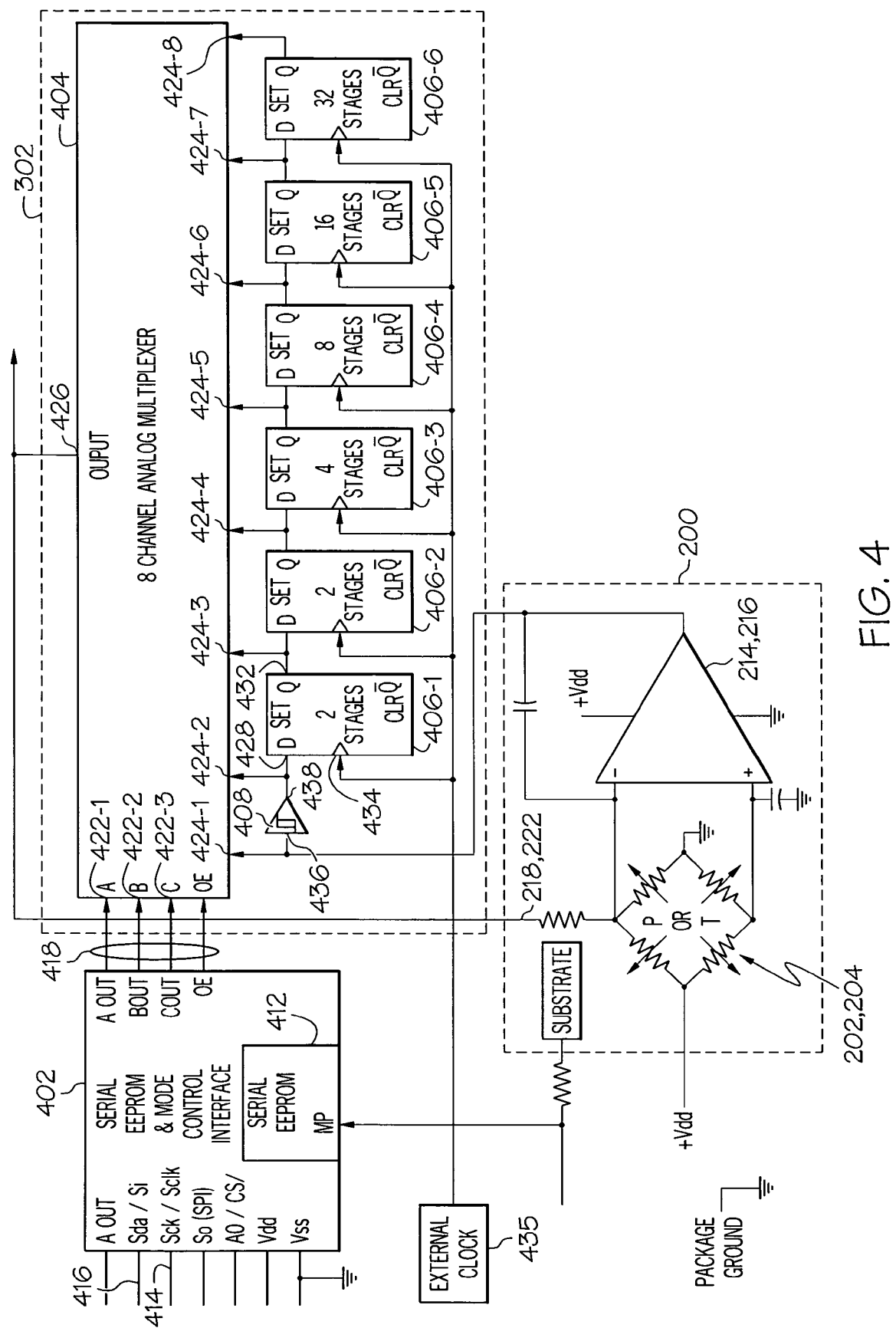
FIG. 4 is a more detailed schematic diagram of portions of the functional block diagram depicted in FIG. 3.

The output circuits 302-1, 302-2, which as was just noted is disposed on the hybrid substrate 106, are coupled to receive the analog sensor signals supplied from its associated sensor circuit 200-1, 200-2. The output circuits 302-1, 302-2 are additionally coupled to receive a mode select signal, which is preferably supplied from a non-illustrated external source. The output circuits 302-1, 302-2 are selectively configurable, in response to the mode select signal, to implement one of the signal processing modes mentioned previously. The output circuits 302-1, 302-2 are additionally operable to supply an output signal representative of the physical parameter sensed by the associated sensor 202, 204. The output circuits 302-1, 302-2 are also coupled to feedback the output signal to the associated sensor circuits 200-1, 200-2, via the associated feedback circuits 218, 222. It will be appreciated that the output circuits 302-1, 302-2 may be configured to implement any one of numerous different signal processing modes. In the depicted embodiment, however, the output circuits 302-1, 302-2 are each configured to selectively implement an analog signal processing mode, an asynchronous, self-digitizing, delta-sigma ($\Delta$-$\Sigma$) processing mode, or various modulus synchronous, self-digitizing, $\Delta$-$\Sigma$ processing modes. It will additionally be appreciated that the output circuits 302-1, 302-2 may be physically implemented using various circuit configurations to provide its functionality. However, a particular preferred physical implementation is depicted in FIG. 4, and with reference thereto will now be described in detail. Before doing so, however, it is noted that FIG. 4 depicts only a single exemplary sensor circuit 200 and only a single exemplary output circuit 302.

Turning now to a description of the output circuit 302, it is seen that it includes an interface circuit 402, a multiplexer 404, a plurality of flip-flops 406 (e.g., 406-1, 406-2, 406-3, . . . 406-6), and a Schmitt trigger circuit 408. The interface circuit 402 includes memory 412, such as a serial EEPROM, a first data input 414, a second data input 416, and a plurality of multiplexer control outputs 418. The first data input 414 is coupled to receive sensor calibration model coefficients, and the second data input 416 is coupled to receive the mode control signal. The interface circuit 402 is operable, upon receipt of the calibration model coefficients, to store the coefficients in its memory 412. The calibration coefficients, as is generally known, are used to provide an algorithmic means of flexibly and reliably increasing sensor accuracy over the entire operational thermal and pressure range without incurring the penalty of added analog hardware. The interface circuit 402 is further operable, in response to the mode control signal, to supply, via the multiplexer control outputs 418, one or multiplexer channel select signals to the multiplexer 404.

In the depicted embodiment, the multiplexer 404 is an 8-channel multiplexer that includes a plurality of channel select inputs 422 (e.g., 422-1, 422-2, 422-3), a plurality signal inputs 424 (e.g., 424-1, 424-2, 424-3, . . . 424-8), and a signal output 426. It will be appreciated that although the depicted multiplexer 404 is an 8-channel multiplexer, the multiplexer 404 could instead be a multiplexer with more or less than this number of channels (e.g., an N-channel multiplexer) that includes $\log_2(N)$ channel select inputs 422, and N-number of signal inputs (e.g., 424-1, 424-2, 424-3, . . . 424-N). No matter the specific number of channels it includes, the multiplexer 404 is coupled to receive, via the channel select inputs 422, the one or more multiplexer channel select signals from the interface circuit 402. In response to the multiplexer channel select signals, the multiplexer 404, in a conventionally known manner, selectively couples one or more of the signal inputs 424 to the signal output 426. The mode-selected output is also fed back to the sensor to null its output signal, thereby closing the loop.

The flip-flops 406 are electrically coupled in series from a first flip-flop 406-1 to a last flip-flop 406-6, and each includes at least a signal input port 428, a signal output port 432, and a clock input 434. The signal input port 428 and signal output port 432 of each flip-flop 406 is coupled to one of the multiplexer signal inputs 424. However, the multiplexer signal input 424 to which a flip-flop signal input port 428 is coupled differs from the multiplexer signal input 424 to which the flip-flop signal output port 432 is coupled. Thus, as is depicted more clearly in FIG. 4, the signal input port 428 and signal output port 432 of the first flip-flop 406-1 are coupled to the second and third multiplexer signal inputs 424-2 and 424-3, respectively, the signal input port 428 and signal output port 432 of the second flip-flop 406-2 are coupled to the third and fourth multiplexer signal inputs 424-3 and 424-4, respectively, and so one for the remaining flip-flops 406-3, 406-4, 406-5, and 406-6.

The flip-flops 406 are preferably implemented using multistage, edge-triggered, D-type flip-flops. For example, in the depicted embodiment, the first and second flip-flops 406-1, 406-2 are each implemented using 2-stage D-type latches, the third flip-flop 406-3 is implemented using a 4-stage D-type latch, the fourth flip-flop 406-4 is implemented using an 8-stage D-type latch, the fifth flip-flop 406-5 is implemented using a 16-stage D-type latch, and the sixth flip-flop 406-6 is implemented using a 32-stage D-type latch. It will be appreciated, however, that this is merely exemplary, and that each flip-flop 406 could be implemented using various other number of stages, as needed or desired. In any case, and as is generally known, a D-type latch functions such that the signal on the signal input port 428 is latched into the input stage on the edge of the signal on the clock input 434, which is supplied from an external clock 435. The signal output propagates one stage at a time per clock edge of the proper polarity (up or down as required by the specific edge triggering implementation).

The Schmitt trigger circuit 408 includes at least a signal input port 436 and a signal output port 438, and serves to convert the analog voltage output from the integrator into a two-state digital signal based on the voltage amplitude at the signal input port 436. The signal input port 436 is coupled to one of the multiplexer signal inputs 424, and more specifically to the first multiplexer signal input 424-1, and is further coupled to receive the analog sensor signal from the sensor circuit 200. The signal output port 438 is coupled to another one of the multiplexer signal input ports 424, and more specifically to the second multiplexer signal input 424-2, and to the signal input port 428 of the first flip-flop 406-1. The Schmitt trigger circuit 408, as is also generally known, outputs a first logic state on the signal output port 438 when the signal on the input port 436 is below a first threshold, outputs an opposite logic state on the signal output port 438 when the signal on the input port 436 is above a second threshold, and retains the logic signal on the signal output port 438 when the signal on the input port 436 is between the first and second thresholds.

The circuit configuration described above and depicted on FIG. 4 allows the output circuit 302, as was previously mentioned, to implement one of three general signal processing modes. Again, as was previously mentioned, these signal processing modes include an analog signal processing mode, an asynchronous, self-digitizing, $\Delta$-$\Sigma$ processing mode, and various modulus synchronous, self-digitizing, Δ-Σ processing modes. More specifically, and as shown in tabular form in FIG. 5, when the mode select signal is such that the interface circuit multiplexer outputs 418 place each of the multiplexer channel select inputs 422-1, 422-2, 422-3 into logic low states (e.g., 422-1=0, 422-2=0, 422-3=0), the output circuit 302 implements the analog signal processing mode. With reference to FIG. 4, this may be readily understood since this state of the multiplexer channel select inputs 422-1, 422-2, 422-3 causes the multiplexer 404 to couple only the first multiplexer signal input 424-1 to the multiplexer signal output 426. As a result, the analog sensor signal supplied from the sensor circuit 200 is supplied as the output signal and is additionally fed back to the sensor circuit 200 to null its output signal.

When connected as a pure analog feedback, using signal input 424-1, the output will be a linear analog voltage. When connected via the output of the Schmitt trigger using signal input 424-2, the output will be an asynchronous PDM signal as the integrator (200) output present at the Schmitt input 436 will slew between the Schmitt's two switching thresholds, thus establishing a digital pulse density modulated (PDM) signal without the need for a clock, thereby termed asynchronous PDM. When a subsequent multiplexer signal input, 424-3 through 424-8, is selected, the Schmitt trigger's output will propagate through the flip-flops 406 in sync with the applied external clock, therefore it is termed synchronous PDM. In the synchronous PDM mode, the feedback delay and resulting spectral content of the feedback and required external clock frequency depends on the signal input 424 that is selected. The later the signal input 424 selected, the lower the spectral content will be in relation to the external clock frequency. For example, if a 32 MHz external clock is applied, and the last signal input 424-8 is selected, there will be a 64 clock cycle delay to propagate the Schmitt trigger 408 output state through the flip-flops 406 to the signal output 426. A complete cycle requires two complete passes through the selected number of flip-flops 406. Therefore, with signal input 424-8 selected and a 32 MHz clock, the primary spectral content will be at 32 MHz/(2*64)=250 KHz. Conversely, if a lower clock frequency is used, a shorter delay must be selected to maintain the integration times within an acceptable range that will not cause the integrator 200 to saturate.

With continued reference to FIGS. 4 and 5, it is seen that when the mode select signal is such that the interface circuit multiplexer outputs 418 place the multiplexer channel select inputs 422-1, 422-2, 422-3 into the following states, 422-1=1, 422-2=0, 422-3=0, the output circuit 302 implements the asynchronous, self-digitizing, Δ-Σ processing mode. This may be readily understood since this state of the multiplexer channel select inputs 422-1, 422-2, 422-3 causes the multiplexer 404 to couple only the second multiplexer signal input 424-2 to the multiplexer signal output 426. As a result, the analog sensor signal from the sensor circuit 200 is processed through the Schmitt trigger circuit 408, which supplies a digital pulse density modulated (PDM) signal as the output signal and the feedback signal to the sensor circuit 200. The manner in which this particular configuration of the output circuit 302 implements the asynchronous, self-digitizing, Δ-Σ processing mode is described in more detail in U.S. Pat. No. 6,674,387, which is assigned to the Assignee of the present application, and the entirety of which is hereby incorporated by reference.

When the mode select signal is such that the interface circuit multiplexer outputs 418 place the multiplexer channel select inputs 422-1, 422-2, 422-3 into states other than those delineated previously for analog and asynchronous PDM, the output circuit 302 implements the synchronous, self-digitizing, Δ-Σ processing mode of varying modulus. This may be readily understood since this state of the multiplexer channel select inputs 422-1, 422-2, 422-3 causes the multiplexer 404 to couple one of the third through the eighth multiplexer signal inputs 424-3 through 424-8 to the multiplexer signal output 426. As a result, the analog sensor signal from the sensor circuit 200 is processed through the Schmitt trigger circuit 408, and one or more of the flip-flops 406, which also results in the output signal and feedback being supplied as a digital PDM signals. The manner in which this particular configuration of the output circuit 302 implements the synchronous, self-digitizing, Δ-Σ processing mode is described in more detail in U.S. Pat. No. 5,245,343, which is assigned to the Assignee of the present application, and the entirety of which is hereby incorporated by reference.

Figure 6:
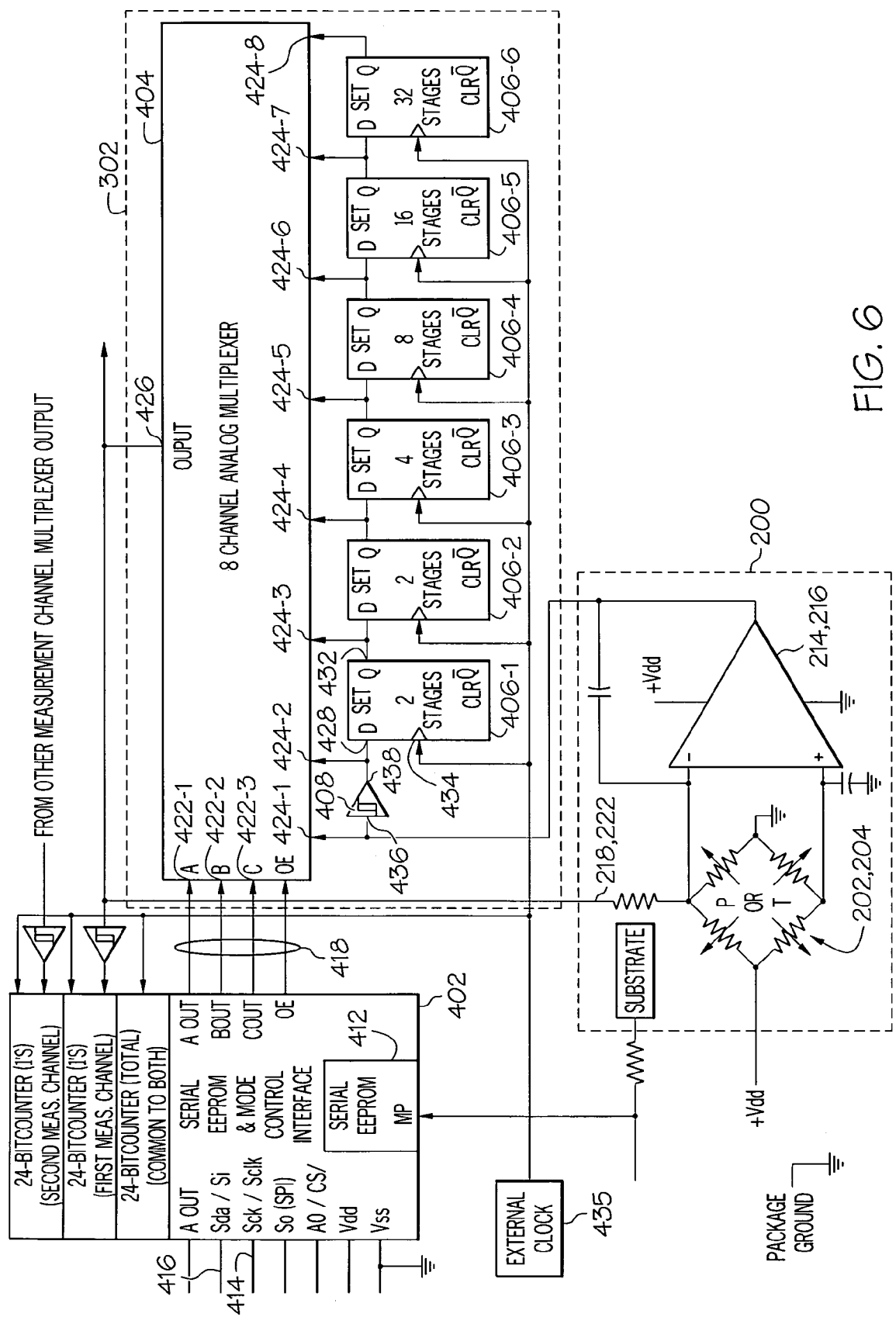
FIG. 6 is an enhanced version of the schematic diagram shown in FIG. 4, and depicts a direct I²C and SPI interface capability for use with microcomputers having insufficient counter-timer resources.

In some embodiments, counter-timer resources may be incorporated within the interface circuit 402 to eliminate any need for additional counter-timer resources within the system's microcomputer to acquire and translate the PDM-based digital output signal into numeric values. In such embodiments, the interface circuit 402 is preferably implemented using an I$^2$C or SPI compatible interface, which is depicted, for completeness, in FIG. 6.

The sensor 100 described herein integrates the sensor 202, 204, sensor circuitry 200, and processing and feedback circuitry 302 within the sensor housing 102, and the processing and feedback circuitry 302 is compatible with both analog and digital end-use circuits and systems.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A sensor, comprising:

a sensor housing;

a sensor circuit disposed within the sensor housing, the sensor circuit adapted to be energized and operable, upon being energized, to supply an analog sensor signal that varies with at least one physical parameter to which the sensor circuit is exposed; and an output circuit disposed within the sensor housing, the output circuit adapted to receive a mode select signal and the sensor signal, the output circuit selectively configurable, in response to the mode select signal, to implement one of a plurality of signal processing modes, and operable, upon receipt of the analog sensor signal, to supply an output signal representative of the at least one physical parameter in accordance with the implemented signal processing mode.

2. The sensor of claim 1, further comprising:
a feedback circuit coupled between the output circuit and the sensor circuit to thereby feedback the output signal to sensor circuit.

3. The sensor of claim 1, wherein the plurality of signal processing modes includes (i) an analog signal processing mode, (ii) an asynchronous, self-digitizing, delta-sigma ($\Delta$-$\Sigma$) processing mode, and (iii) a synchronous, self-digitizing, $\Delta$-$\Sigma$ processing mode.

4. The sensor of claim 3, wherein, when the output circuit is configured to implement the analog signal processing mode, the output signal an analog signal that is at least proportional to the analog sensor signal.

5. The sensor of claim 3, wherein, when the output circuit is configured to implement the asynchronous, self-digitizing, $\Delta$-$\Sigma$ processing mode, the output signal is a digital pulse-density modulation (PDM) signal.

6. The sensor of claim 3, wherein, when the output circuit is configured to implement the synchronous, self-digitizing, $\Delta$-$\Sigma$ processing mode, the output signal is a digital pulse-density modulation (PDM) signal.

7. The sensor of claim 1, wherein the output circuit comprises:
an interface circuit adapted to receive the mode select signal and operable, upon receipt thereof, to supply one or more channel select signals;
an N-channel multiplexer circuit having N-number of signal inputs, and a signal output that supplies the output signal representative of the at least one physical parameter, the multiplexer coupled to receive the one or more channel select signals and operable, upon receipt thereof, to couple one or more of the signal inputs to the signal output, one of the signal inputs coupled to receive the analog sensor signal from the sensor circuit;
a plurality of flip-flops electrically coupled in series from a first flip-flop to a last flip-flop, each flip-flop having at least a signal input port, a signal output port, and a clock input, the signal input port of each flip-flop coupled to one of the multiplexer signal inputs, and the signal output port of each flip-flop coupled to one of the multiplexer signal inputs, the multiplexer signal input to which a flip-flop signal input port is coupled differs from the multiplexer signal input to which the flip-flop signal output port is coupled;
a Schmitt trigger circuit having at least a signal input port and a signal output port, the signal input port coupled to one of the multiplexer signal inputs and to receive the analog sensor signal from the sensor circuit, the signal output port coupled to another one of the multiplexer signal input ports and to the first flip-flop signal input port.

8. The sensor of claim 7, further comprising:
a feedback circuit coupled between the multiplexer signal output and the sensor circuit to thereby feedback the output signal to sensor circuit.

9. The sensor of claim 7, wherein each of the plurality of flip-flops is a D-type flip-flop.

10. The sensor of claim 1, wherein the at least one physical parameter includes pressure, and wherein the sensing system further comprises:
a pressure sensitive diaphragm adapted to be exposed to the pressure and configured, upon being exposed thereto, to move,
wherein at least a portion of the sensor circuit is disposed on the pressure sensitive diaphragm.

11. The sensor of claim 10, wherein the sensor circuit includes a plurality of resistors, each resistor having a resistance that varies at least with movement of the pressure sensitive diaphragm.

12. The sensor of claim 11, wherein the plurality of resistors is electrically coupled as a Wheatstone bridge circuit.

13. The sensor of claim 11, wherein the sensor circuit further includes an integrator circuit coupled to the plurality of resistors and operable to supply the sensor signal.

14. The sensor of claim 1, wherein the at least one physical parameter includes temperature, and wherein the sensing system further comprises:
one or more resistors having a resistance that varies at least with the temperature.

15. The sensor of claim 14, wherein the sensor circuit further includes an integrator circuit coupled to the one or more resistors and operable to supply the sensor signal.

16. A pressure sensor, comprising:
a sensor housing;
a pressure sensitive diaphragm disposed within the sensor housing, the pressure sensitive diaphragm adapted to be exposed to a pressure and configured, upon being exposed thereto, to move;
a plurality of resistors disposed on the pressure sensitive diaphragm, each resistor having a resistance that varies at least with movement of the pressure sensitive diaphragm, the plurality of resistors adapted to be energized and supply a voltage signal based at least in part on the resistances thereof;
an amplifier circuit disposed within the sensor housing, the amplifier circuit coupled to receive the voltage signal and operable, upon receipt thereof, to supply a sensor signal;
an output circuit disposed within the sensor housing, the output circuit adapted to receive a mode select signal and the sensor signal, the output circuit selectively configurable, in response to the mode select signal, to implement one of a plurality of signal processing modes, and operable, upon receipt of the analog sensor signal, to supply an output signal representative of the at least one physical parameter in accordance with the implemented signal processing mode.

17. The sensor of claim 16, further comprising:
a feedback circuit coupled between the output circuit and the sensor circuit to thereby feedback the output signal to sensor circuit.

18. The sensor of claim 16, wherein the plurality of signal processing modes includes (i) an analog signal processing mode, (ii) an asynchronous, self-digitizing, delta-sigma ($\Delta$-$\Sigma$) processing mode, and (iii) a synchronous, self-digitizing, $\Delta$-$\Sigma$ processing mode.

19. The sensor of claim 16, wherein the output circuit comprises:
an N-channel multiplexer circuit having N-number of signal inputs, and a signal output that supplies the output signal representative of the at least one physical parameter, the multiplexer adapted to receive the mode select signal and operable, upon receipt thereof, to couple one or more of the signal inputs to the signal output, one of the signal inputs coupled to receive the analog sensor signal from the sensor circuit;
a plurality of flip-flops electrically coupled in series from a first flip-flop to a last flip-flop, each flip-flop having at least a signal input port, a signal output port, and a clock input, the signal input port of each flip-flop coupled to one of the multiplexer signal inputs, and the signal output port of each flip-flop coupled to one of the multiplexer signal inputs, the multiplexer signal input to which a flip-flop signal input port is coupled differs from the multiplexer signal input to which the flip-flop signal output port is coupled;

a Schmitt trigger circuit having at least a signal input port and a signal output port, the signal input port coupled to one of the multiplexer signal inputs and to receive the analog sensor signal from the sensor circuit, the signal output port coupled to another one of the multiplexer signal input ports and to the first flip-flop signal input port.

20. The sensor of claim 19, further comprising:

a feedback circuit coupled between the multiplexer signal output and the sensor circuit to thereby feedback the output signal to sensor circuit.

* * * * *